May 20, 1958 G. BYRD 2,835,401
BOAT TRANSPORTING AND LAUNCHING DEVICE
Filed Sept. 17, 1956 3 Sheets-Sheet 1
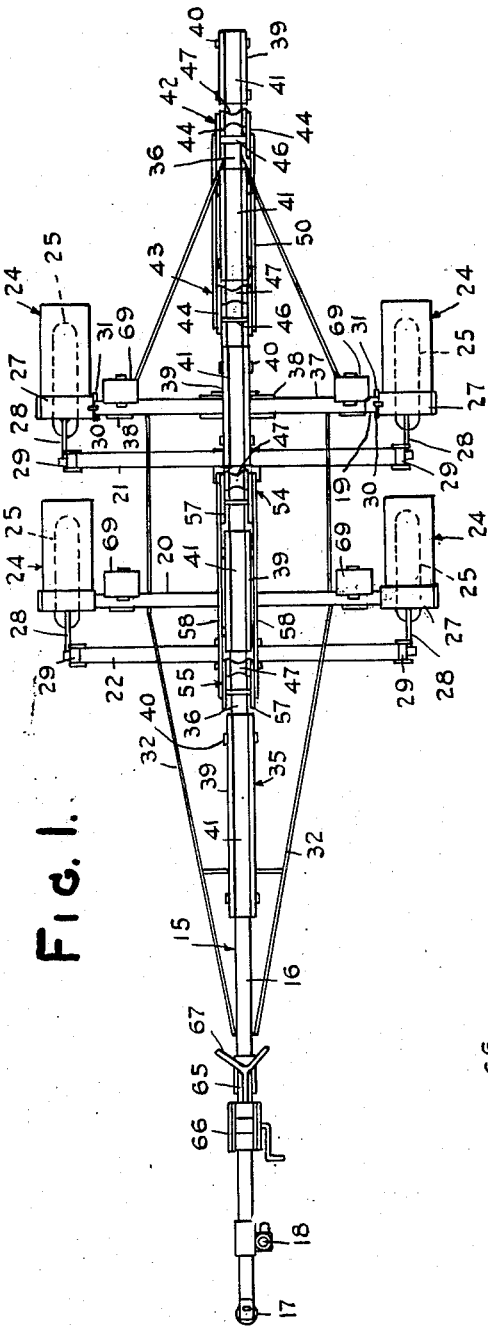
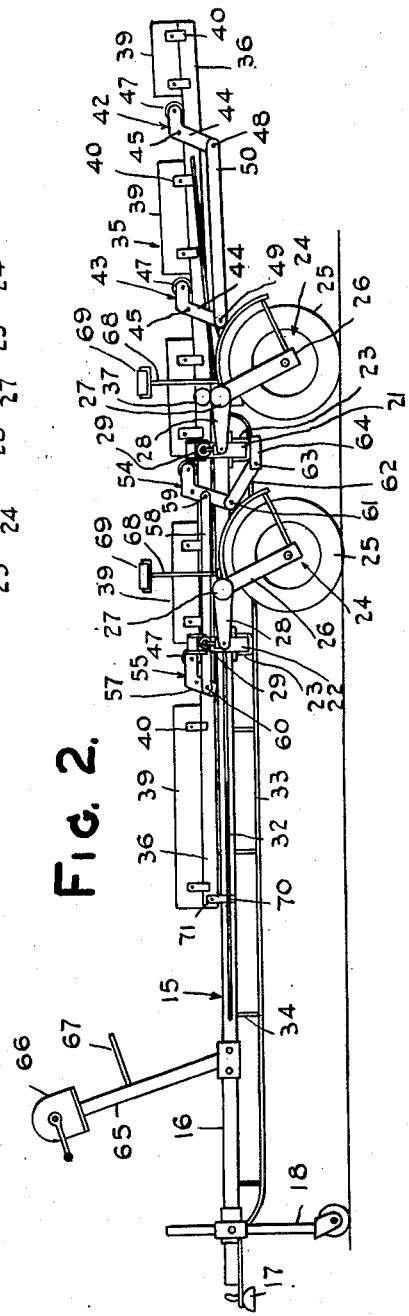
INVENTOR.
GEORGE BYRD
BY
ATTORNEY May 20, 1958
G. BYRD
2,835,401
BOAT TRANSPORTING AND LAUNCHING DEVICE
Filed Sept. 17, 1956
3 Sheets-Sheet 2
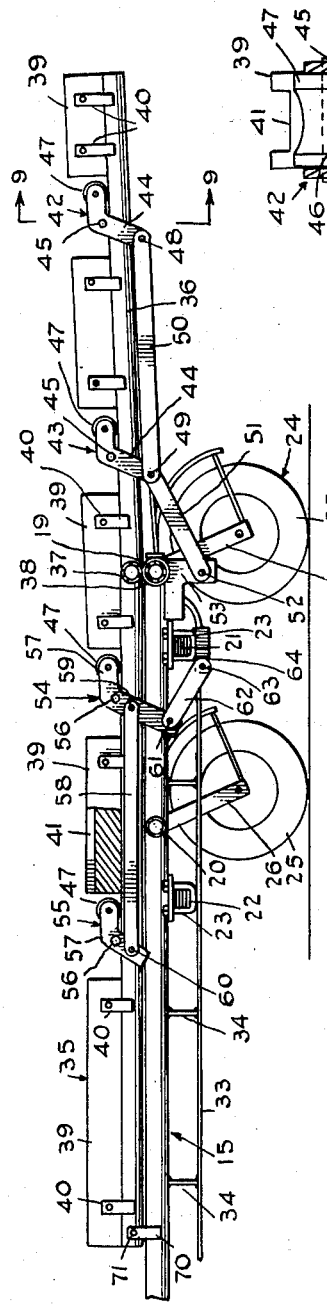
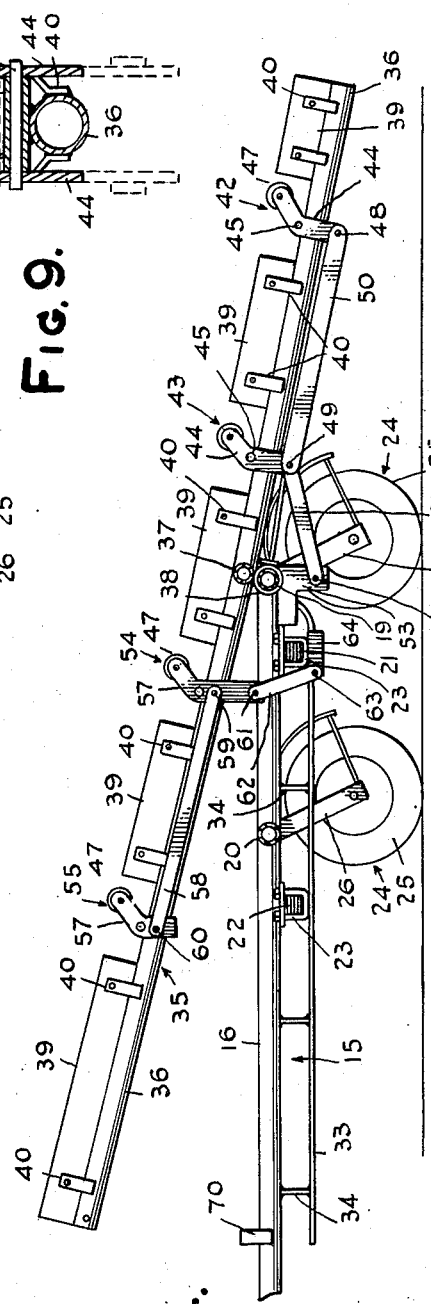
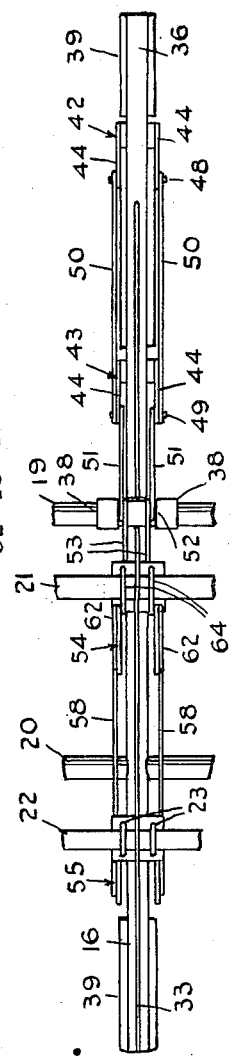
INVENTOR.
GEORGE BYRD
BY
*B. P. Fishburne, jr.*
ATTORNEY May 20, 1958 G. BYRD 2,835,401
BOAT TRANSPORTING AND LAUNCHING DEVICE
Filed Sept. 17, 1956 3 Sheets-Sheet 3
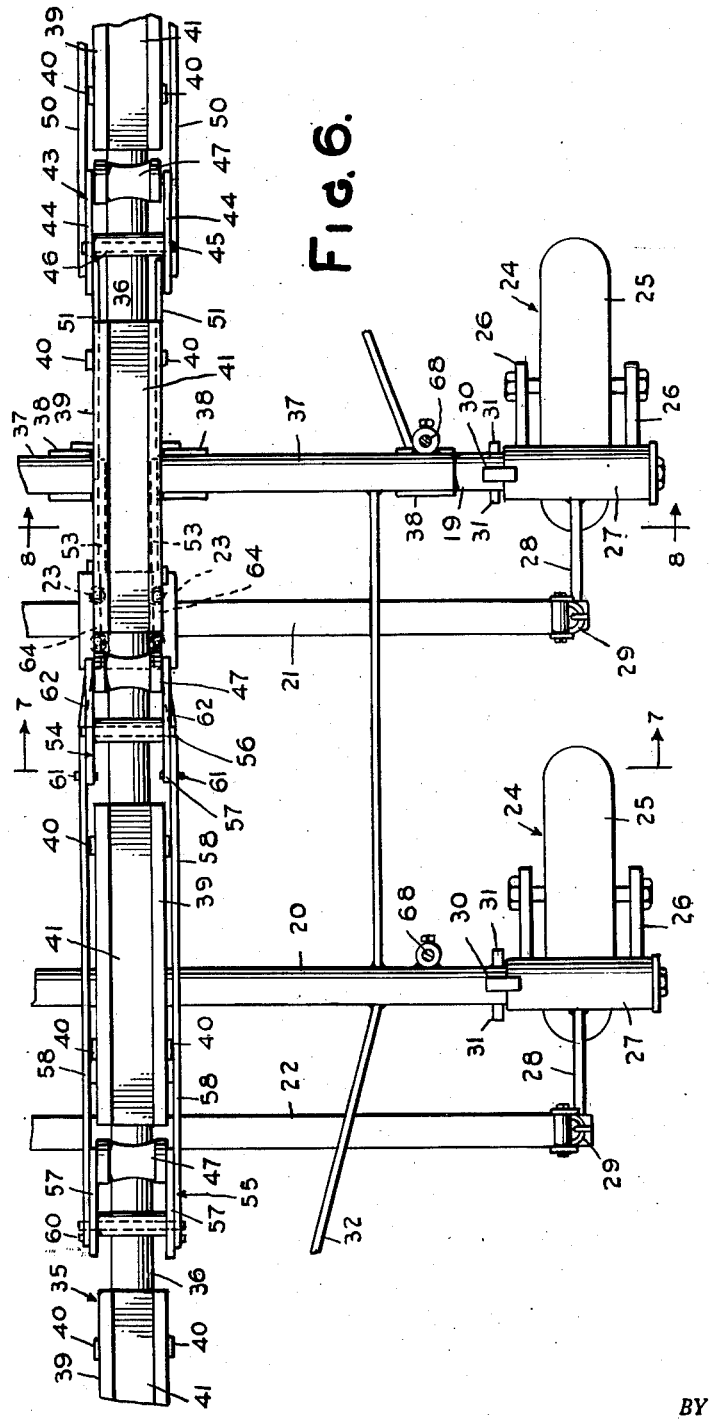
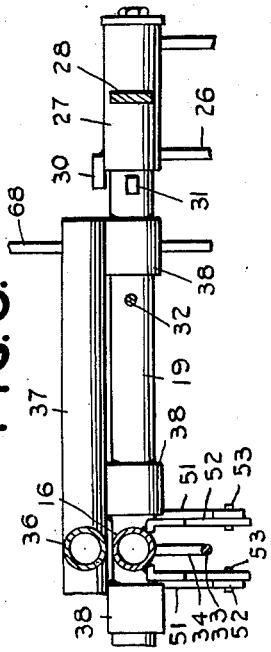
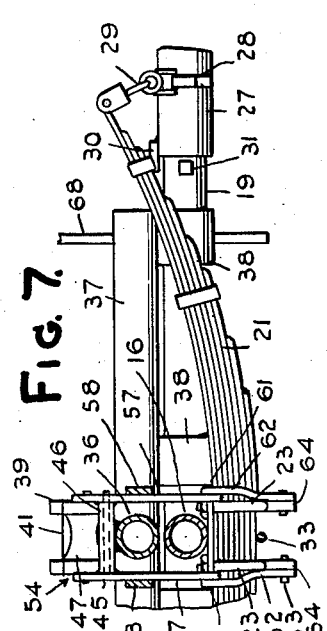
INVENTOR.
GEORGE BYRD
BY
B. P. Fishburne, Jr.
ATTORNEY United States Patent Office 2,835,401
Patented May 20, 1958

2,835,401

BOAT TRANSPORTING AND LAUNCHING DEVICE

George Byrd, Corpus Christi, Tex., assignor to E. L. Caldwell & Sons, Corpus Christi, Tex., a firm composed of Edward L. Caldwell, Jr., Frederick C. Caldwell and Mabel B. Caldwell Application September 17, 1956, Serial No. 610,312

7 Claims. (Cl. 214—506)

This invention relates to boat transporting and launching vehicles.

A primary object of the invention is to provide an improved and simplified boat carrier or trailer, having novel means to facilitate moving the boat off of and onto the trailer.

A further object of the invention is to provide boat transporting device having novel boat lifting and lowering roller means, which is automatically operated or rendered active or inactive when the pivoted boat supporting member is shifted to or from the inclined position.

Another object is to provide a boat trailer having a tiltable supporting frame or member, and elevatable and retractable roller means associated with the member and raised and lowered automatically by the tilting of the member upon its pivot.

Another and general object of the invention is to provide a boat trailer having automatic launching mechanism for raising the boat from the fixed keel engaging support, and constructed and arranged so as not to damage the keel or hull of the boat.

A still further object of the invention is to provide in a boat trailer of the above-mentioned character a tiltable supporting structure and boat lifting mechanism operated automatically thereby, said structure being always tail heavy and thereby tending to assume an inclined position with respect to its wheeled support, but rendering the entire trailer heavy or unbalanced toward its front end when the supporting structure is in a substantially level position, for proper engagement with an automobile trailer hitch.

Another object is to provide a boat trailer having boat lifting or launching means which are automatically operated by gravity when the pivoted supporting structure is allowed to tilt downwardly at the rear end of the trailer.

Other objects and advantages of the invention will be apparent during the course of the following description.

In the accompanying drawings forming a part of this application and in which like numerals are employed to designate like parts throughout same, Figure 1 is a plan view of a boat trailer embodying the invention, Figure 2 is a side elevation of the same, Figure 3 is an enlarged fragmentary side elevation of the trailer, partly in section, showing particularly the tiltable boat supporting structure and associated elements, Figure 4 is a further fragmentary side elevation similar to Figure 3 but with the tiltable supporting structure in an inclined position, as when the boat is being loaded onto or launched from the trailer, Figure 5 is a fragmentary bottom plan view of the trailer as shown in Figure 3, Figure 6 is an enlarged fragmentary plan view of the trailer with a central portion thereof broken away, Figure 7 is a fragmentary transverse vertical section taken on line 7—7 of Figure 6, Figure 8 is a similar section taken on line 8—8 of Figure 6, Figure 9 is a fragmentary transverse vertical section taken on line 9—9 of Figure 6.

In the drawings, wherein for the purpose of illustration is shown a preferred embodiment of the invention, the numeral 15 designates generally a wheeled trailer having a main longitudinal tongue 16, provided at its forward end with a suitable coupling or hitch 17, rigidly secured thereto and adapted for connection with a mating member fixed to the rear bumper of an automobile or the like, not shown. The tongue 16 may be adjustably supported near its forward end by a vertically adjustable leg 18 or the like, as shown, which leg will be elevated so as to clear the ground when the trailer is being towed by the automobile.

At its rear end and somewhat forwardly thereof, the tongue 16 has a pair of rigid transverse horizontal bars 19 and 20 rigidly secured thereto by welding or the like and extending at right angles thereto for substantial distances on opposite sides of the same. The bars 19 and 20 are in the plane of the tongue 16, as indicated. Transverse leaf springs 21 and 22 underlie the tongue 16, somewhat forwardly of the corresponding bars 19 and 20, and are rigidly secured to the tongue as by the U-bolt means 23. The springs 21 and 22 extend for substantial distances beyond opposite sides of the tongue 16, and parallel to the bars 19 and 20, as indicated. The ends of the bars 19 and 20 carry wheel assemblies 24, including rubber tired wheels 25, journaled for rotation upon vertically swingable yokes 26, provided at their upper ends with horizontal rotatable sleeves 27, rigidly secured thereto. The sleeves 27 fit telescopically and slidably over the ends of the bars 19 and 20, and each sleeve 27 has a forwardly projecting generally horizontal arm 28 rigidly secured thereto, and connected at its forward end with one end of the adjacent transverse leaf spring as shown generally at 29 of the drawings. Interfitting lugs 30 and 31 on the sleeves 27 and bars 19 and 20 respectively limit the extent of rotation of the sleeves 27 upon their bars or axles. The arrangement provides a type of resilient knee-action wheel suspension, which renders the trailer stable and soft riding. Both sets of wheels 25 and their fixed axles or bars 19 and 20 are arranged near the rear end of the trailer 15, Figure 2, the rearmost wheels being at the rear end of the trailer. To render the trailer 15 further rigid, the same may be provided with brace rods 32 lying in a horizontal plane and interconnecting the bars 19 and 20 and the tongue 16 as indicated. These brace rods may be welded or otherwise rigidly secured to the tongue 16 and transverse bars 19 and 20. An additional underslung longitudinal truss rod 33 may be provided directly beneath the tongue 16 and connected therewith through the medium of short vertical braces 34, rigidly secured thereto by welding or the like. This arrangement imparts to the tongue 16 a truss-like stiffness or rigidity so that the single tongue may support the weight of the boat adequately without bending.

Associated with and bodily mounted upon the wheeled trailer 15 is a boat supporting and launching frame, cradle or platform 35 extending longitudinally of the tongue 16, and being disposed above the same. The frame 35 embodies a main longitudinal frame bar or beam 36 which is rigid and substantially straight, as shown. Near and somewhat rearwardly of its longitudinal center the beam 36 has a rigid transverse cross arm 37 rigidly secured thereto as by welding and extending at right angles to the beam 36 for equal distances on opposite sides of the same. The cross arm 37 is disposed directly above and parallel to the fixed axle 19, and is movably connected therewith by a plurality of axially spaced sleeves 38, welded to the bottom of the arm 37 and rotatably mounted upon the bar 19. The arrangement is such that the entire frame 35 may pivot upon the fixed transverse bar 19 and swing from a level to an inclined position as shown by Figures 3 and 4. It will be noted that the beam 36 is preferably bowed slightly upon opposite sides of the cross arm 37 so that when the frame 35 is in the lowered position, its forward portion is level and parallel to the tongue 16 while its portion rearwardly of the cross arm 37 is upwardly inclined slightly as shown in Figures 2 and 3. This arrangement helps to properly cradle or support the keel of the boat, which is not absolutely straight.

A plurality of longitudinally extending keel cradling blocks 39 of wood, hard rubber, fibrous material or the like, are rigidly mounted upon the top of the beam 36 in spaced relation as shown. The blocks 39 may be rigidly connected with the beam 36 by means of straps 40 or the like, welded thereto. Each keel block 39 is provided in its top with a longitudinal groove 41, adapted to receive the keel of the boat. The several blocks 39 are adapted to provide substantially a continuous support for the keel throughout the major portion of its length, with only very small gaps between the blocks, as shown.

Automatic means are provided to elevate the keel of the boat from engagement with the blocks 39 whenever the frame 35 is elevated to the inclined position of Figure 4, and to lower the keel into engagement with the blocks 39 whenever the frame 35 is returned to the level condition of Figure 3. This means comprises a rearward pair of longitudinally spaced bell crank yokes 42 and 43 arranged between the rearward blocks 39. Each of the yokes 42 and 43 comprises a pair of generally L-shaped bell crank levers 44 including horizontal and depending generally vertical arms, Figure 3. The bell crank levers 44 are arranged upon opposite sides of the longitudinal beam 36, in straddling relation thereto and each pair of arms 44 is rigidly connected by transverse pin means 45, Figure 9. The pins 45 of the yokes 42 and 43 are journaled within bearings 46, fixedly secured as by welding to the top of the beam 36. The arrangement is such that the yokes 42 and 43 are freely pivotal in vertical planes but cannot shift longitudinally of the beam 36 or be displaced therefrom. Each of the yokes 42 and 43 has a boat keel engaging roller 47 freely journaled between the trailing ends of the horizontal arm portions of the bell cranks 44, as shown.

The lower ends of the yokes 42 and 43 project somewhat below the rear portion of beam 36, and the lowermost ends of the pairs of bell cranks 44 on opposite sides of the beam are pivotally secured at 48 and 49 to a pair of parallel longitudinal links 50, adapted to turn the yokes 42 and 43 upon their pivots 45 in unison. An additional pair of somewhat shorter inclined links 51 have their upper rear ends connected with the pivot 49 and their lower leading ends pivoted at 52 to a fixed depending bracket means 53, which is rigidly secured to the bottom of the cross bar 19 as by welding or the like.

A forward pair of vertically swingable bell crank yokes 54 and 55 similar in construction to the yokes 42 and 43 are pivoted to the top of the beam 36 at 56 for vertical swinging movement, and the pivot constructions for the yokes 54 and 55 may be identical in construction to the pivots for the yokes 42 and 43, as detailed in Figure 9. The yokes 54 and 55 include pairs of substantially L-shaped bell crank levers 57, similar in construction and arrangement to the bell crank levers 44 previously described. The bell crank levers 57 are interconnected at their outer sides by horizontal longitudinal links 58, having their ends pivoted to the bell cranks 57 at 59 and 60. The links 58 will cause the yokes 54 and 55 to turn upon their pivots 56 in unison. The trailing ends of the horizontal arm portions of the bell cranks 57 carry keel engaging rollers 47, identical with the rollers 47 of the yokes 42 and 43. The lowermost ends of the bell cranks 57 of pivoted yoke 54 are pivotally connected at 61 with short inclined links 62, having their lower ends pivoted at 63 to fixed elements 64 on the bottom of the U-bolts 23 of transverse spring 21, near the longitudinal center thereof. The rollers 47 constitute anti-friction means.

It should now be apparent that when the frame 35 is tilted or swung about its pivot upon the bar 19 that this motion will cause the pivoted yokes 42, 43, 54 and 55 to swing in unison about their respective pivots 45 and 56. The yokes and their interconnecting links 50 and 58 are bodily carried by the tiltable frame 35 and the operating links 51 and 62 have corresponding ends attached to fixed elements 53 and 64 of the trailer 15, their other corresponding ends being attached to elements which move with the tiltable frame. Consequently, whenever the frame 35 is shifted from the horizontal position of Figure 3 to the inclined position of Figure 4, the links 51 will push upon the links 50 and cause the pivoted yokes 42 and 43 with their rollers 47 to be elevated slightly above the tops of the blocks 39. Simultaneously, the links 62 toward the forward end of the trailer, will pull upon the bottoms of the bell cranks 57 and turn the yokes 54 and 55 counterclockwise upon their pivots 56 to correspondingly elevate the forward two rollers 47 above the blocks 39. When the frame 35 is returned to the level position, Figure 3, the rollers 47 will all be lowered automatically in unison to their positions slightly below the tops of the blocks 39, as shown. The arrangement is therefore such that pivoting or swinging of the boat supporting frame 35 from a level to an inclined position automatically causes the elevating of the boat lifting rollers 47, and the returning of the frame 35 to the level position of Figure 3 causes the automatic lowering of the rollers.

Near and somewhat rearwardly of the forward end of tongue 16 is rigidly mounted an upstanding somewhat forwardly inclined post 65, provided at its upper end with a conventional hand operated winch 66 to be used for drawing the boat up onto the frame 35 or for launching the boat when the frame is tilted as in Figure 4. The rear side of the post 65 carries a forked rest 67 for the bow of the boat to steady the same upon the trailer.

Mounted upon the transverse bars 37 and 20, near and inwardly of the wheels 25 and spaced a substantial distance outwardly of the beam 36 are vertically adjustable upstanding rods or posts 68, having pivoted hull engaging pads or shoes 69 carried by their upper ends, as shown. These shoes 69 can adjust themselves automatically on horizontal longitudinal pivot axes to properly engage the sloping sides of the hull or boat. The shoes 69 are spaced a considerable distance above the frame 35 and associated elements, and are vertically adjustable with the rods 68 by conventional means.

It should be pointed out that while a particular type of trailer 15 having a particular form of wheel suspension mechanism has been shown and described in connection with the tiltable frame 35, that any other preferred type of trailer, or one having a different wheel suspension or running gear, may be employed instead of the trailer 15.

*Operation*

When a boat is being transported behind an automobile or the like, the hitch 17 of the trailer 15 is connected with the mating hitch part of the towing vehicle and the standard 18 is elevated. The trailer 15 will be substantially level and the tiltable frame 35 carrying the boat will be level as in Figures 2 and 3. In order to lock or hold the frame 35 in level position, a pair of upstanding apertured lugs 70 are rigidly secured to opposite sides of the tongue 16 adjacent the forward end of the beam 36, so as to lie adjacent the opposite sides of this beam when the same is in level position. A bolt or pin 71 engages through the apertures of the lugs 70 and through a registering opening formed transversely through the beam 36, and this will lock the frame 35 in the horizontal position, Figure 2.

Since the pivot of the frame 35 which is the bar 19 is substantially at the rearmost wheels 25, the center of gravity of the entire load including the boat will be forwardly of the rear wheels, when the frame 35 is level. This is true, notwithstanding the fact that the frame 35 itself will always be tail-heavy and tending to assume the inclined position of Figure 4, due to the weight of the motor, gas tank, etc., near the rear end of the boat. When the frame 35 carrying the boat is level, Figure 2, the entire apparatus will be slightly front or nose-heavy because of the location of the pivot point 19, and this will exert a slight downward load on the rear end of the towing vehicle, instead of an upward thrust which would be undesirable.

During transportation, the bow of the boat will rest upon the fork 67 and the keel will rest upon the several blocks 39 and engage within their grooves 41 and be supported substantially continuously throughout its length. The self-adjusting shoes 69 will engage the sides of the hull and stabilize the boat upon the trailer. The several rollers 47 will be in the lowered positions below the tops of the blocks 39 at this time and out of engagement with the keel.

When the boat is to be launched from the trailer, the locking pin 71 is removed and the frame 35 which is tail-heavy, will tend to swing automatically to the inclined position of Figure 4. As it moves to this inclined position, the several rollers 47 will be elevated automatically and in unison by the push-pull linkage, previously described in detail, and the weight of the boat will be transferred to the several rollers 47 and lifted from the cushioning blocks 39. When this occurs, the boat will obviously roll down the inclined frame for launching, and the winch 66 may be employed as found desirable.

When the boat is loaded onto the trailer, the frame 35 is again positioned as in Figure 4 with the rollers 47 automatically elevated, and the winch 66 is used to pull the boat up onto the frame 35, the rollers 47 at this time engaging the keel and supporting it above the blocks 39. The frame 35 is then shifted to the horizontal position of Figure 2, and during this movement, the rollers 47 are automatically lowered for transferring the keel and the weight of the boat gently to the several blocks 39, whereupon the frame 35 may again be locked by the pin 71 in the horizontal position.

It should be apparent that the automatic means for lifting and lowering the boat relative to the cradling blocks 39 is highly simplified, compact and sturdy in construction, as well as fool-proof in operation. It should also be apparent that this system of transferring the weight of the boat from the blocks 39 to and from the rollers 47 takes place gently and gradually during the actual tilting of the boat from the level to the launching or loading position. With this arrangement, a minimum strain is placed upon the keel during the actual transferring of the weight of the boat to and from the rollers, and the transferring is gentler than would be the case where the boat was lifted vertically by the rollers while the frame 35 is level.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described the invention, I claim:

1. A boat transporting and launching vehicle comprising a wheeled support, a boat supporting member pivoted to said support and swingable from a substantially horizontal to an inclined position, a plurality of bell crank elements pivoted to said member in spaced relation longitudinally of the member, rollers carried by the tops of the bell crank elements and adapted to be raised thereby above the level of said member and to be retracted below the top of said member, and linkage means interconnecting said bell crank elements so that they will turn in unison upon their pivots and connected with said wheeled support, whereby the turning of the boat supporting member upon its pivot will cause the linkage means to automatically turn the bell crank elements upon their pivots for raising or lowering said rollers.

2. A boat transporting and launching vehicle comprising a wheeled support, a boat supporting member pivoted to said support and swingable from a substantially horizontal to an inclined position, pairs of spaced roller carrying elements pivoted to the member and adapted to have their rollers projecting above the member and retracted below the top of said member, links interconnecting the elements of said pairs and extending longitudinally of said member, a push link having one end connected with an element of one of said pairs and its opposite end connected with the wheeled support, and a pull link having one end connected with an element of the other pair and its opposite end connected with the wheeled support, the arrangement being such that turning of said member upon its pivot from the level to the inclined position will automatically cause the push link to elevate one pair of rollers while the pull link is simultaneously elevating the other pair of rollers, all of said roller carrying elements turning upon their pivots in unison.

3. A boat transporting and launching apparatus comprising, a first support to be connected with an automobile to be transported thereby, wheel means supporting the first support, a second support, fixed pivot means connecting the second support with the first support so that the second support is carried by the first support and may be swung substantially vertically with relation to the first support, boat engaging means carried by the second support, movable roller means mounted upon the second support to engage and elevate the boat to move it out of engagement with the boat engaging means, and operating means connected with the first support and the roller means and automatically actuated when the second support is swung upon its pivot to cause the roller means to elevate the boat.

4. A boat transporting and launching apparatus comprising, a first support to be connected with an automobile to be transported thereby, wheel means supporting the first support, a second support extending longitudinally of the direction of travel of the first support, pivot means connecting the second support with the first support so that the second support may be swung substantially vertically with relation to the first support in a direction longitudinally of the direction of travel of the first support, the pivot means being held at substantially the same elevation with respect to the first support during the swinging of the second support, boat engaging means carried by the second support, movable roller means mounted upon the second support to engage and elevate the boat to move it out of engagement with the boat engaging means, and operating means connected with the first support and connected with the roller means and automatically actuated by the swinging movement of the second support upon its pivot for lowering its rear end, the operating means then causing the roller means to elevate the boat.

5. A boat transporting and launching apparatus comprising, a first elongated support to be connected with an automobile to be transported thereby, wheel means supporting the first elongated support, a second elongated support extending longitudinally of the first elongated support, pivot means connecting the second elongated support with the first elongated support so that the second elongated support may be swung substantially vertically with relation to the first elongated support in a direction longitudinally of the first elongated support, the pivot means being held at substantially the same elevation with respect to the first support during the swinging of the second support, keel track means extending longitudinally of the second support and mounted thereon, rollers arranged adjacent to the keel track means to engage the keel of the boat, levers carrying the rollers and pivotally mounted upon the second support, and operating means connected with the first support and connected with the levers, said operating means being automatically actuated when the second support is swung upon its pivot and its rear end lowered, the operating means then causing the levers to move the rollers upwardly and elevate the keel out of contact with the keel track means.

6. A boat transporting and launching apparatus comprising, a trailer frame including a longitudinal tongue and a transverse bar arranged near the rear end of the tongue, wheels supporting the transverse bar, the forward end of the tongue being adapted for connection with an automobile, a supporting and launching frame including a longitudinal tongue and a transverse bar arranged near the longitudinal center of the second-named tongue, the second-named transverse bar being arranged above and adjacent to the first-named transverse bar, means pivotally mounting the second-named transverse bar upon the first-named transverse bar so that the second-named tongue may be swung substantially vertically longitudinally of the first-named tongue, the rear end of the second-named tongue extending rearwardly beyond the first-named tongue, means for detachably connecting the forward end of the second-named tongue with the first-named tongue, means mounted upon the second-named tongue and extending longitudinally thereof to engage with the keel portion of the boat, levers pivoted upon the second-named tongue and arranged near the keel portion engaging means, and operating means connected with said levers and also connected with said trailer frame, said operating means being automatically actuated when the second-named tongue is swung upon its pivot to an inclined position with respect to the first-named tongue, the operating means then moving the levers which elevate the rollers and the rollers then elevate the boat so that its keel portion disengages the keel portion engaging means.

7. A boat transporting and launching apparatus comprising, a generally horizontal first support, means for connecting the generally horizontal first support with an automobile or the like so that the first support is made to travel with the automobile or the like, wheel means, means for mounting the wheel means upon the generally horizontal support so that the generally horizontal support is supported by the wheel means in a generally horizontal position while it is connected with the automobile or the like, a second support for engaging and holding the boat, means for angularly adjustably mounting the second support upon the first support about a transverse axis, anti-friction means mounted upon the second support to be raised and lowered with relation to the second support, operating means connected with the anti-friction means and adapted to raise the anti-friction means with relation to the second support so that the anti-friction means engages and elevates the boat, and means connecting the operating means with the generally horizontal first support whereby the operating means will move the anti-friction means in response to the tilting of the second support with relation to the first support while the first support remains generally horizontal at the time that the second support is tilted.

References Cited in the file of this patent

UNITED STATES PATENTS

| | | |
|---|---|---|
| 1,658,770 | Murray et al. | Feb. 7, 1928 |
| 2,471,901 | Ross | May 31, 1949 |
| 2,558,418 | Brueckman | June 26, 1951 |
| 2,708,045 | Shontz | May 10, 1955 |
| 2,733,823 | Evans | Feb. 7, 1956 |
| 2,741,383 | Leckert | Apr. 10, 1956 |
| 2,754,017 | Hart et al. | July 10, 1956 |
| 2,788,908 | Lynd | Apr. 16, 1957 |

FOREIGN PATENTS

| | | |
|---|---|---|
| 690,682 | France | June 24, 1930 |